US012793266B2

(12) United States Patent
Zhao

(10) Patent No.: US 12,793,266 B2
(45) Date of Patent: Nov. 10, 2026

(54) VARIED DENSITY GRID CAMERA CALIBRATION CHART

(71) Applicant: Sony Interactive Entertainment Inc., Tokyo (JP)

(72) Inventor: Frank Zhao, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 18/816,191

(22) Filed: Aug. 27, 2024

(65) Prior Publication Data

US 2026/0065509 A1 Mar. 5, 2026

(51) Int. Cl.
*G06T 7/80* (2017.01)
*G06T 7/13* (2017.01)

(52) U.S. Cl.
CPC . *G06T 7/80* (2017.01); *G06T 7/13* (2017.01)

(58) Field of Classification Search
CPC ................ G06T 7/80; G06T 7/85; G06T 7/13
See application file for complete search history.

(56) References Cited

U.S. PATENT DOCUMENTS 7,155,030 B2 * 12/2006 Kim .......................... G06T 7/80 356/127
8,619,144 B1 * 12/2013 Chang .................. H04N 17/002 348/187
8,644,634 B2 * 2/2014 Wu .................... G01M 11/0292 356/124.5
8,773,652 B2 * 7/2014 Miahczylowicz-Wolski ............... G02B 27/62 356/124.5
10,432,912 B2 * 10/2019 Wendel ................ H04N 13/246
11,082,566 B2 * 8/2021 Xu ..................... H04N 1/00045
11,889,979 B2 * 2/2024 Kimpe ................... A61B 5/444
12,315,198 B2 * 5/2025 Schick ...................... G06T 7/80
2002/0067855 A1 * 6/2002 Chiu ......................... G06T 7/80 382/199
2004/0252195 A1 * 12/2004 Lu .......................... G02B 27/62 348/188
2008/0186384 A1 * 8/2008 Ishii ..................... H04N 17/002 348/E17.002
2009/0123060 A1 * 5/2009 Liu .................. G01N 21/95684 382/149
2009/0175530 A1 * 7/2009 Sjostrom ............... G06T 7/0004 382/152
2014/0211227 A1 * 7/2014 Yedid Am ............. H04N 1/506 358/1.13
2015/0009291 A1 * 1/2015 Cheng .................. H04N 13/296 348/46
2016/0028936 A1 * 1/2016 Saphier .................... G02B 7/32 348/87

(Continued)

OTHER PUBLICATIONS https://www.abelcine.com/articles/blog-and-knowledge/tech-news/abelcines-new-family-of-resolution-analysis-charts?srsltid= AfmBOopjMm2puZFwnecQPRbaVqFAaQQfPe9fDi6qyzXATTjWyCUD40uC (Author Jesse Rosen, May 31, 2013) Title "AbelCine's New Family of Resolution Analysis Charts".*

*Primary Examiner* — Brian P Yenke
(74) *Attorney, Agent, or Firm* — Kilpatrick Townsend & Stockton LLP

(57) ABSTRACT

A chart for camera calibration is tilted away from the camera. The part of the chart that is further from the camera has a relatively sparse grid to make finding grid corners easier, whereas the part of the chart closer to the camera has a relatively dense grid to provide more data for better calibration.

17 Claims, 7 Drawing Sheets

(56) References Cited

U.S. PATENT DOCUMENTS

| | | | | |
|---|---|---|---|---|
| 2017/0070731 | A1* | 3/2017 | Darling | G06T 7/85 |
| 2017/0372491 | A1* | 12/2017 | Doganis | H04N 5/44504 |
| 2018/0364483 | A1* | 12/2018 | Mallinson | G02B 26/127 |
| 2018/0367681 | A1* | 12/2018 | Xu | G06T 7/85 |
| 2019/0080478 | A1* | 3/2019 | Zhang | G06T 7/85 |
| 2019/0205641 | A1* | 7/2019 | Ernst | G06T 7/13 |
| 2019/0350513 | A1* | 11/2019 | Carrein | A61B 5/0077 |
| 2019/0364206 | A1* | 11/2019 | Dal Mutto | G06T 7/73 |
| 2020/0364895 | A1* | 11/2020 | Bradski | G06T 7/73 |
| 2021/0225035 | A1* | 7/2021 | Devitt | G06T 7/50 |
| 2022/0108476 | A1* | 4/2022 | Zhang | G06V 10/25 |
| 2022/0148225 | A1* | 5/2022 | Myokan | H04N 25/61 |
| 2022/0270294 | A1* | 8/2022 | Bao | G06T 7/13 |
| 2024/0153098 | A1* | 5/2024 | Zhou | G06V 10/457 |
| 2025/0124593 | A1* | 4/2025 | Troccoli | H04N 7/15 |
| 2025/0164412 | A1* | 5/2025 | Shen | G01N 21/954 |
| 2025/0245844 | A1* | 7/2025 | Kimura | H04N 17/002 |

* cited by examiner

VARIED DENSITY GRID CAMERA CALIBRATION CHART

FIELD

The present application relates to varied density grid camera calibration charts.

BACKGROUND

Charts with grids may be used to calibrate cameras. Camera calibration may be particularly important for virtual reality (VR) applications, computer vision applications, and other applications.

Generally, multiple calibration images must be taken to provide high diversity, in part because a chart directly facing the camera exhibits redundant information, e.g., a point above the chart midline at a first distance gives redundant calibration information to that given by a point directly below the first point and below the midline at the first distance. As understood herein, multiple calibration images complicate automated calibration

SUMMARY

Accordingly, a method includes providing a substrate and tilting the substrate at an oblique angle with respect to a line of sight of a camera. The method includes calibrating the camera using one and only one image of the substrate. The substrate includes a relatively sparse grid to make finding grid corners easier in a region of the substrate that is further from the camera when the substrate is tiled relative to the camera and a relatively dense grid in a region of the substrate that is closer to the camera when the substrate is tiled relative to the camera to provide more data for calibration.

In some examples the method may includes providing at least one quick respond (QR) code on the substrate configured for automated pose estimation to establish a search area for grid corners. In some examples the substrate can have one and only one QR code whereas in other embodiments the substrate has plural QR codes.

In non-limiting implementations the sparse grid and dense grid include respective squares. The squares of the sparse grid can be four times larger than at least some squares in a first region of the dense grid. The squares of the sparse grid may be sixteen times larger than at least some squares in a second region of the dense grid. At least one QR code may be in at least one square of the first region of the dense grid and no QR codes may appear in the second region of the dense grid or in the sparse grid.

In another aspect, an assembly includes at least one substrate with at least first and second regions of subdivisions. The subdivisions of the first region are of larger size than the subdivisions of the second region. At least one camera is positioned to generate at least one image of the substrate to calibrate at least one parameter of the camera.

In another aspect, an assembly includes at least one camera and at least one substrate positionable at an oblique angle relative to an optical axis of the camera. The substate includes a far region relative to the camera that has subdivisions of a first size and a near region relative to the camera that has subdivisions of a second size smaller than the first size. The camera is configured to calibrate at least one parameter of the camera based on at least one image of the substrate.

The details of the present application, both as to its structure and operation, can best be understood in reference to the accompanying drawings, in which like reference numerals refer to like parts, and in which:

DETAILED DESCRIPTION

Figure 1:
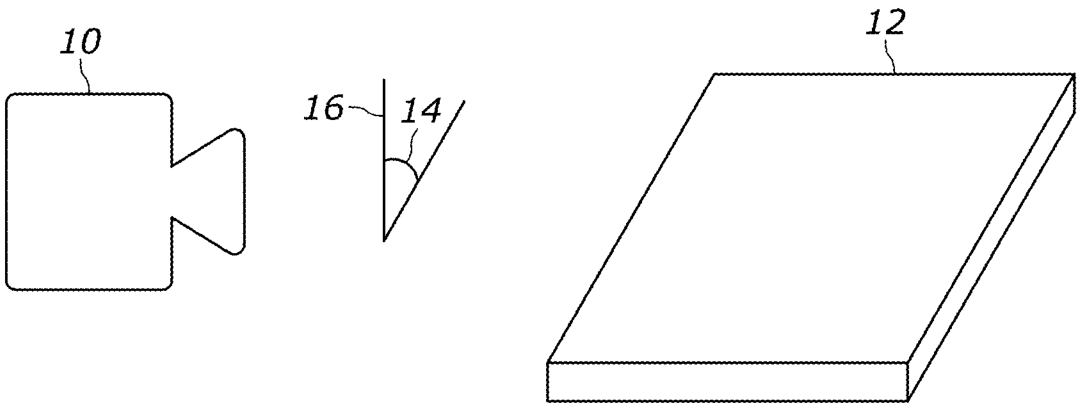
FIG. 1 illustrates a schematic view of a first system for calibrating a single 2D or 3D camera.

This disclosure relates generally to computer ecosystems including aspects of consumer electronics (CE) devices, including cameras and CE device networks such as but not limited to computer game networks. A system herein may include server and client components which may be connected over a network such that data may be exchanged between the client and server components. The client components may include one or more cameras and/or one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry. A processor system may include one or more processors.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

FIG. 1 illustrates that a single two-dimensional (2D) or three-dimensional (3D) camera 10 may be calibrated using a substrate, configured as a calibration chart 12 that is tilted at an oblique angle 14 relative to the vertical 16 (because the camera is assumed to be aimed along the horizontal). In general, the substrate is tilted at an oblique angle relative to the line of sight or optical axis of the camera. Details of an example substrate are given further herein. Camera intrinsics including camera field of view and/or focal length and/or depth of field may be calibrated using the chart. Distortion calibration also may be effected using the chart. These calibrations may be implemented on cameras with variable focus lenses and variable zoom lenses, for example, and may involve 3D depth sensing.

Figure 2:
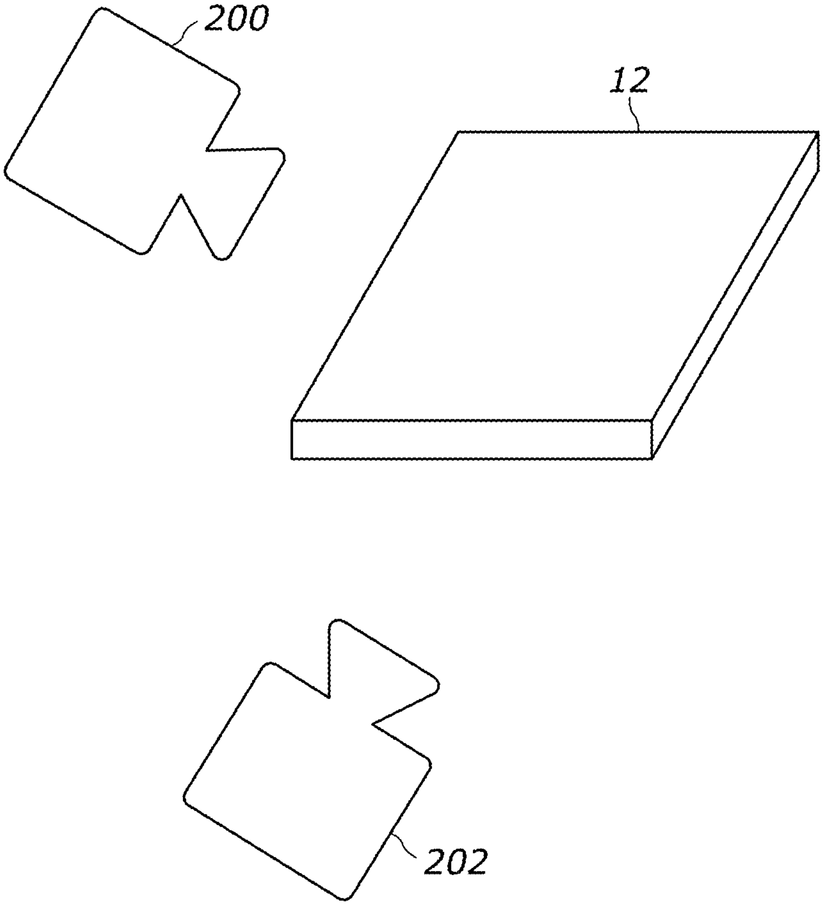
FIG. 2 illustrates a schematic view of a second system for calibrating plural 2D or 3D cameras.

FIG. 2 illustrates that a substrate implemented in one example by the chart 12, tilted as described above, may be used to calibrate plural cameras 200, 202 for stereoscopic calibration to track objects in 3D space using two simultaneous views.

Figure 3:
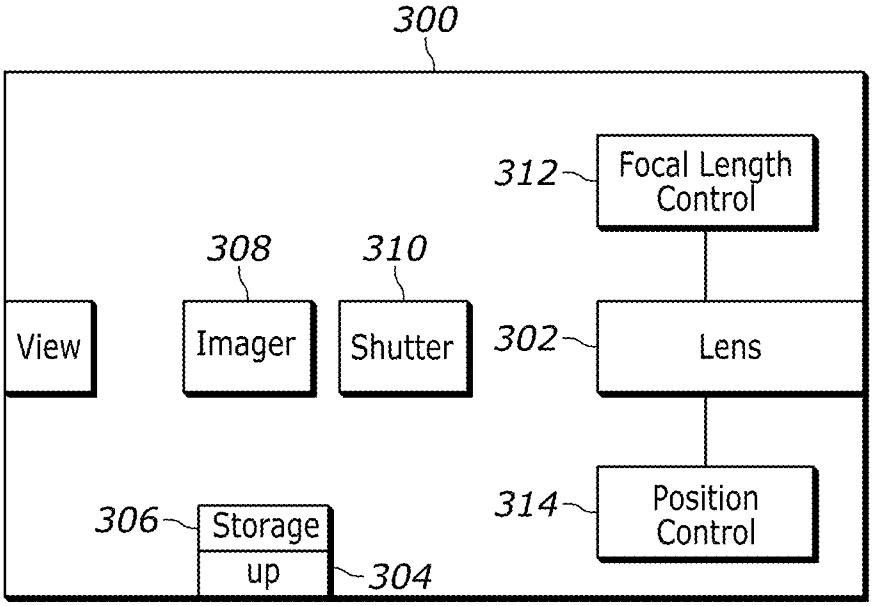
FIG. 3 illustrates a block diagram of an example camera.

The cameras herein, in non-limiting embodiments, may be implemented by Sony Alpha 1 or Alpha 6600 cameras (which may be trademarked by Sony). FIG. 3 illustrates a camera 300 consistent with present principles that includes a lens 302 such as a telephoto lens with, for example, a field of view of about 2.5°. The camera may include one or more processors 304 accessing one or more storages 306 and communicating with one or more imagers 308 that receives light from the lens 302 through, if desired, a shutter 310. The focal length of the lens 302 may be altered by a focal length controller 312 responsive to control signals from the processor 304. In some embodiments the lens 302 may be movable by a position controller 314 responsive to control signals from the processor 304. The position controller 314 may be implemented by, e.g., a motion stabilization device or other device coupled to the lens 302 (including coupled to the hood of the lens.)

Figure 4:
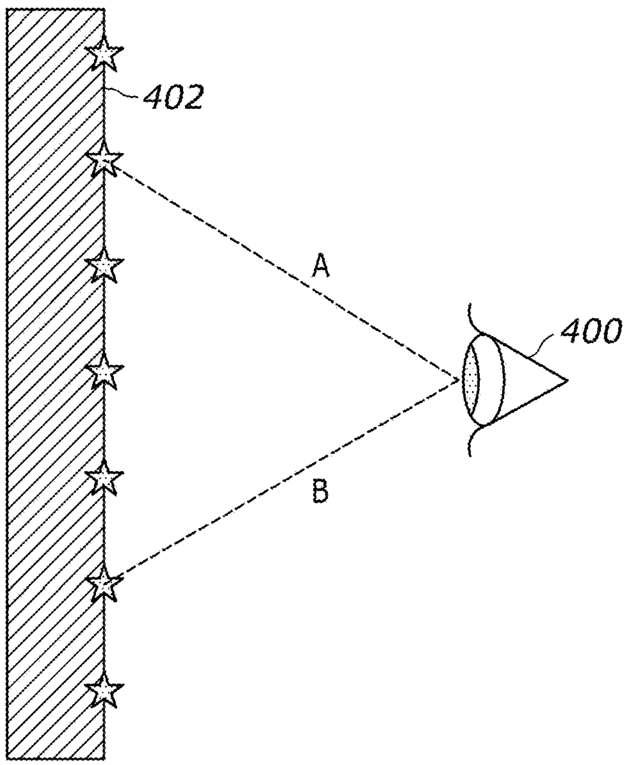
FIG. 4 illustrates a calibration substrate not tilted relative to a camera (rendered as an image of an eye in the figure)
Figure 5:
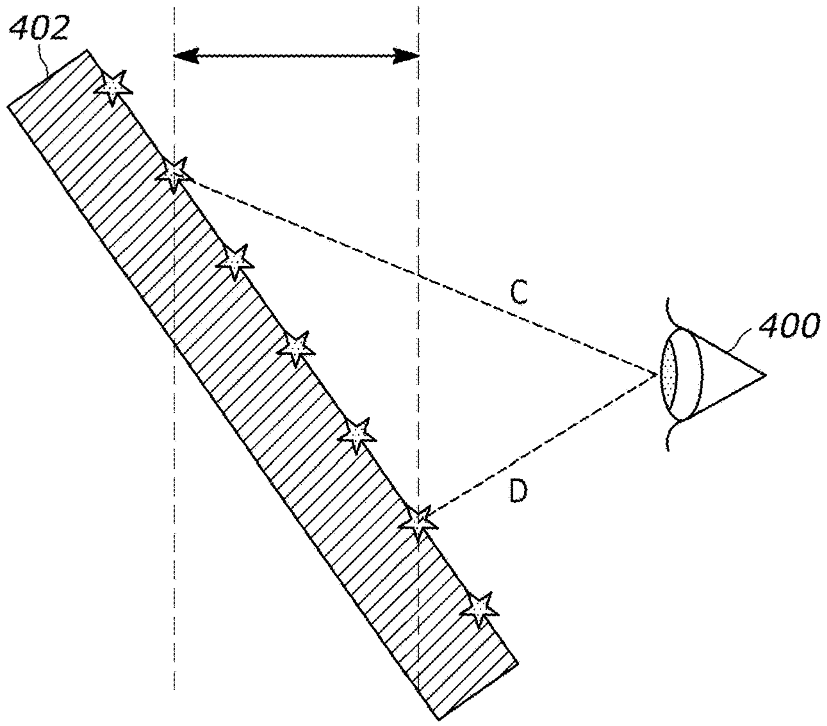
FIG. 5 illustrates a calibration substrate that is tilted relative to a camera.

Refer now to FIGS. 4 and 5, which use an image of an eye 400 to represent a camera to be calibrated. For spherical camera lenses, data points "A" and "B" on a substrate 402 in FIG. 4 oriented perpendicular to the line of sight of the eye 400 are similar and in fact provide redundant information because once "A" is known, "B" provides no additional information. On the other hand, as shown in FIG. 5, a substrate 402 oriented at an oblique angle to the line of sight and having data points "C" and "D" which have different distances to the camera provides diversity in the Z-axis data when the 3-dimensional coordinates of the data points are provided to the calibration algorithm.

Figure 6:
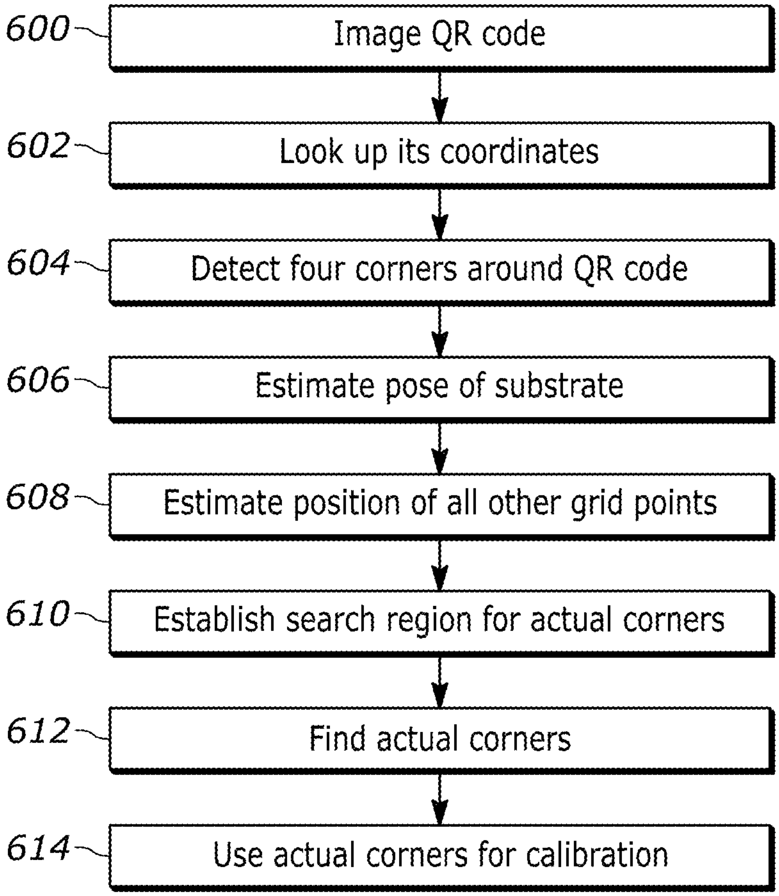
FIG. 6 illustrates example logic in example flow chart format consistent with present principles for QR code processing.

FIG. 6 illustrates preliminary logic for using a QR code on the substrate that is imaged at state 600 to look up its known 3D coordinates on the substrate at state 602. Moving to state 604, the four corners around the QR code can be detected and used at state 606 to estimate the orientation and scale of the substrate. This is called pose estimation. With an estimated pose, the position of all other points can be estimated at state 608 using reprojection (place 3D positions into 2D positions in a camera view).

Once the reprojection has been done, the estimated corners and estimates for the other grid point locations are used at state 610 to establish a search region for the actual corners in the grid. The actual corners are identified at state 612 using, e.g., machine vision and then used at state 614 to calibrate the camera.

As understood herein, a single QR may be used even though plural QR codes are shown in ensuing figures since one code provides four corners from which all positions of other points can be reprojected.

As understood herein, more data points on the substrate means more frame coverage and more accurate calibration, but accuracy of the estimates is poor in regions of the substrate that are closer to the camera (and the grid in those closer regions thus tighter and more dense in the image of the substrate). Accuracy in more distanced regions of the substrate is better but the estimated points in those regions appear to be very close together and cannot be used for precise and effective calibration. However, the estimated positions can help establish a search region in which the actual QR code corner can be located with high accuracy, which then can be used for calibration.

For example, if a search is conducted around the estimate for a corner, the search region needs to be large, but if grid subdivisions overlap, there will be potential for error. Use of a smaller search area avoids overlap, but can result in the search never finding the corner point.

Accordingly, as recognized herein, by lowering the density of the grid in the region farther away from the camera, the search area can be increased with high confidence of finding the correct corner. In the region close to the camera, the corners are already far apart enough to avoid the search area problem, and if the grid size were denser in this region, then more data points are available to the calibration algorithm, resulting in a more accurate calibration.

Note that a single QR code can be used to locate four starting corners to use for pose estimation, which is required to estimate other reprojected corner points that don't have QR codes beside them. Although more QR codes means better pose estimation, they do not contribute to calibration quality and thus may be omitted.

Figure 7:
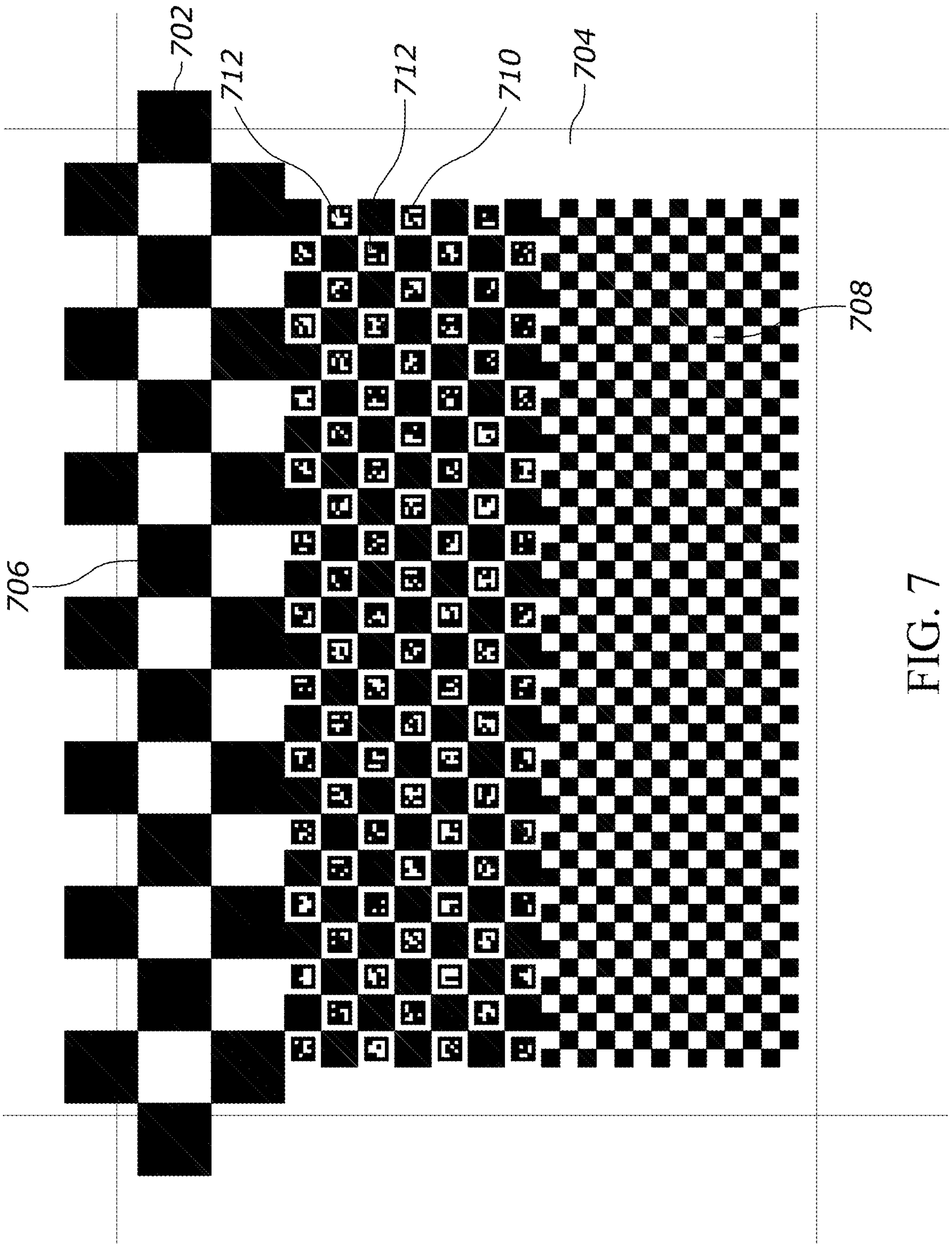
FIG. 7 illustrates an example calibration substrate consistent with present principles.

Now refer to FIG. 7, illustrating a substrate 700 consistent with principles above. As shown, the substrate 700 includes at least first and second regions 702, 704 having respective grids of subdivisions of varying size. More specifically, in the region 702 furthest away from the camera when the substrate is tilted, a relatively sparse grid 706 is on the substrate 700 to make finding grid corners easier. On the other hand, the region 704 is closer to the camera than the region 702 when the substrate is tilted and so it includes a relatively dense grid 708 of subdivisions.

Furthermore, in the example shown a third region 710 may be disposed between the first and second regions 702, 704 and may include a grid having subdivisions of sizes in between the sizes of the first and second regions 702, 704. In the example shown, a respective QR code 712 is disposed in every subdivision of the third region 710 although as stated above some or even all of the QR codes shown in FIG. 7 but one may be omitted.

In the example shown, the grid subdivisions are square for simplicity of calculation. Other shapes may be used.

In the example shown, the squares of the sparse grid 706 are four times larger than at least some squares in the third region, i.e., are a factor of two larger in a linear dimension for simplicity of calculation, it being understood that other multiples of size differentials may be used.

In the example shown, the squares of the sparse grid 706 are sixteen times larger than at least some squares in the dense grid 708 of the second region 704, i.e., are a factor of four larger in a linear dimension for simplicity of calculation, it being understood that other multiples of size differentials may be used.

Accordingly, it may now be appreciated that during calibration, the substrate 700 may be tilted obliquely relative to the camera optical axis as shown in FIGS. 1, 2, and 5 for more data diversity. More data in the form of diversity from tilt and use of smaller and larger grid subdivisions enables the use of one and only one image of the substrate for calibration instead of multiple images. The one or more QR code markers provide automated pose estimation to reproject estimated points and establish a search area for more grid corners. The grid is relatively less dense grid in the region of the substrate more distanced from the camera when the substrate is tilted to make it easier to search for grid corners, whereas the grid a relatively more dense in regions of the substrate closer to the camera when the substrate is tilted to provide more data for better calibration. QR codes are omitted where they are not needed, because an unneeded QR code might confuse grid corner detection.

Figure 8:
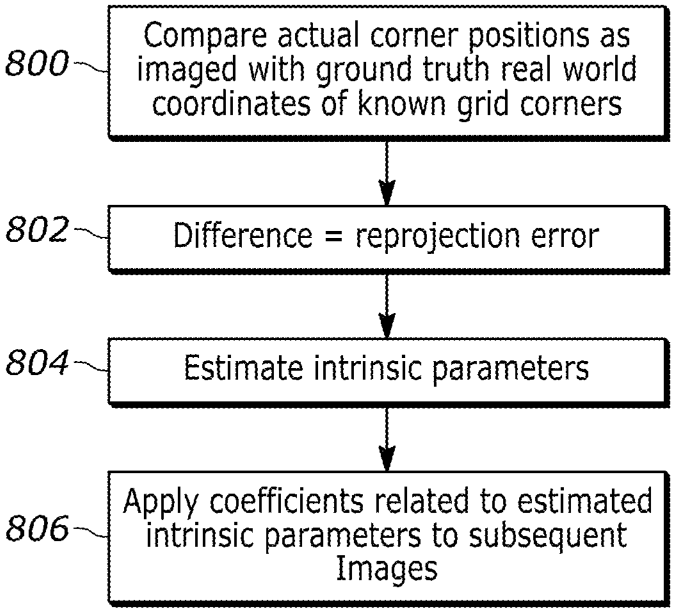
FIG. 8 illustrates example logic in example flow chart format consistent with present principles for calibration.

FIG. 8 illustrates general calibration logic, expanding on state 614 of FIG. 6. State 800 indicates that the actual corner positions as imaged from FIG. 6 are compared to ground truth real world coordinates of the grid corners as known beforehand. The difference between ground truth and imaged grid corners establishes a reprojection error at state 802, which is used at state 804 to estimate the errors or deviations in the intrinsic parameters of the camera that led to the reprojection error. The errors or deviations in the intrinsic parameters of the camera may be used, for example, to establish coefficients that can be applied to subsequent images at state 806 to correct for the errors or deviations in the intrinsic parameters of the camera.

Figure 9:
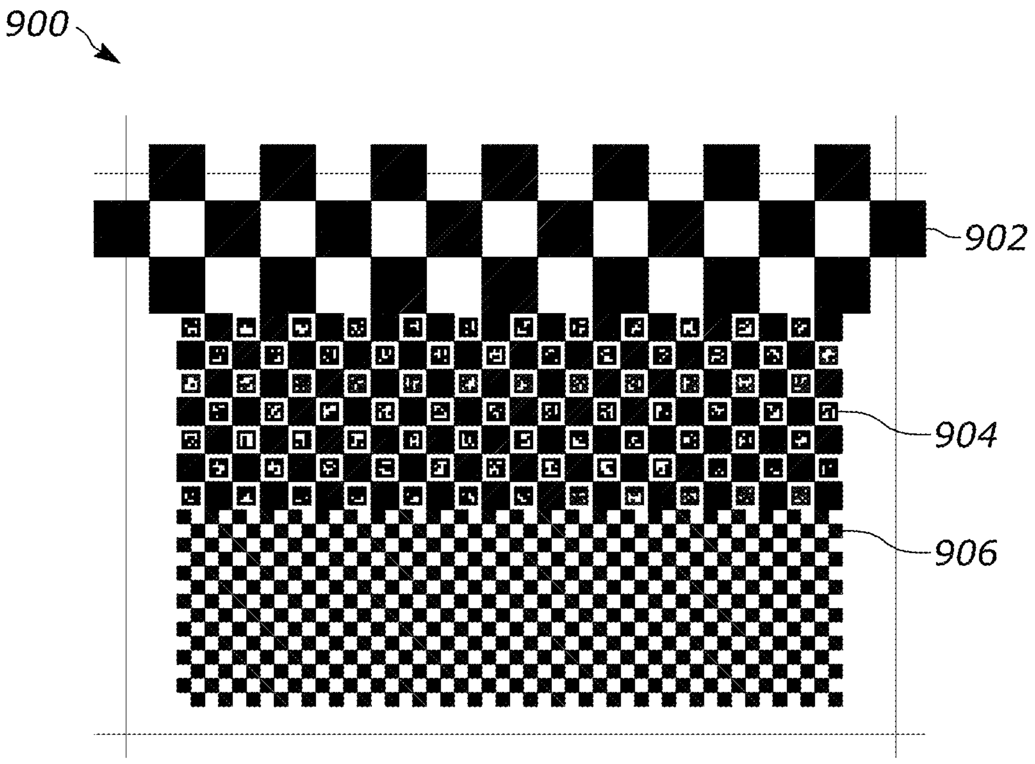
FIG. 9 illustrates another example calibration substrate.

FIG. 9 illustrates a substrate 900 having relatively large alternating black and white blocks 902 in two rows with no QR codes, followed by seven rows of smaller blocks 904 (sides half the length size of lengths of the blocks 902) every other one of which contains a QR code, followed in turn by seventeen rows of still-smaller alternating black and white blocks 906 (sides half the length of the sides of the blocks 904) with no QR codes.

While particular techniques are herein shown and described in detail, it is to be understood that the subject matter which is encompassed by the present invention is limited only by the claims.

What is claimed is:

1. A method, comprising:

providing one and only one substrate comprising at least one quick response (QR) code at a known location on the substrate, wherein the substrate comprises a first region and a second region, the first region comprises a first grid of points, the second region comprises a second grid of points that is more dense than the first grid of points;

tilting the substrate at an oblique angle with respect to a line of sight of a camera so that the first region is further from the camera than the second region; and calibrating the camera using one and only one image of the substrate tilted at the oblique angle with respect to the line of sight of the camera, wherein calibrating the camera further comprises:

establishing a search area within the one and only one image based on an estimated position of a first grid point of the first grid of points and the at least one QR code; and searching for the first grid point within the search area.

2. The method of claim 1, wherein calibrating the camera using the one and only one image of the substrate further comprises:

generating an estimated pose of the substrate based on the known location of the at least one QR code and positions within the one and only one image of grid points surrounding the at least one QR code; and determining the estimated position within the one and only one image of the first grid point of the first grid of points or the second grid of points based on the estimated pose of the substrate.

3. The method of claim 1, wherein the substrate comprises one and only one QR code.

4. The method of claim 1, wherein the substrate comprises plural QR codes.

5. The method of claim 1, wherein the first region comprises first squares having corners defined by the points of the first grid of points and the second region comprises second squares having corners defined by the points of the second grid of points.

6. The method of claim 5, wherein:

the substrate further comprises a third region;

the third region comprises third squares having corners defined by a third grid of points; and the first squares are four times larger than the third squares.

7. The method of claim 6, wherein the first squares are sixteen times larger than the second squares.

8. The method of claim 7, comprising at least one quick response (QR) code in at least one square of the third squares and no QR codes in the first squares or the second squares.

9. The method of claim 8, wherein the first region and the second region are separated from each other by the third region.

10. An assembly, comprising:

one and only one substrate comprising at least one quick response (QR) code at a known location on the substrate and at least first and second regions of subdivisions, the subdivisions of the first region being of larger size than the subdivisions of the second region; and a camera positioned with its optical axis at an oblique angle to a surface of the substrate such that the first region of the substrate is further from the camera than the second region of the substrate, the camera being configured to generate at least one image of the substrate while positioned with its optical axis at the oblique angle to the surface of the substrate, and to calibrate at least one parameter of the camera based on the at least one image by:

establishing a search area around an estimated position within a first subdivision corner surrounding the QR code within the at least one image; and searching for the first subdivision corner within the search area.

11. The assembly of claim 10, wherein the camera is further configured to calibrate the at least one parameter based on the at least one image by:

generating an estimated pose of the substrate based on the known location of the at least one QR code and positions within the at least one image of subdivision corners surrounding the at least one QR code; and determining the estimated position within the at least one image of the first subdivision corner based on the estimated pose of the substrate.

12. The assembly of claim 10, wherein the substrate comprises one and only one QR code.

13. The assembly of claim 10, wherein the substrate comprises plural QR codes.

14. The assembly of claim 10, wherein the subdivisions comprise respective squares.

15. The assembly of claim 14, wherein the squares of the first region are four times larger than at least some squares in a first sub-region of the second region.

16. The assembly of claim 15, wherein the squares of the first region are sixteen times larger than at least some squares in a second sub-region of the second region.

17. The assembly of claim 16, comprising at least one quick response (QR) code in at least one square of the first sub-region of the second region and no QR codes in the second sub-region or in the first region, the first sub-region being between the first region and the second sub-region.

* * * * *